United States Patent
Aly

(10) Patent No.: US 12,130,009 B2
(45) Date of Patent: Oct. 29, 2024

(54) HELICAL BAFFLE FOR ONCE-THROUGH STEAM GENERATOR

(71) Applicant: BWXT Canada Ltd., Cambridge (CA)

(72) Inventor: Kareem M. A. Aly, Charlotte, NC (US)

(73) Assignee: BWXT Canada Ltd., Cambridge (CA)

( * ) Notice: Subject to any disclaimer, the term of this patent is extended or adjusted under 35 U.S.C. 154(b) by 1205 days.

(21) Appl. No.: 16/934,822

(22) Filed: Jul. 21, 2020

(65) Prior Publication Data

US 2020/0393123 A1 Dec. 17, 2020

Related U.S. Application Data

(63) Continuation of application No. PCT/IB2018/053203, filed on May 8, 2018.

(60) Provisional application No. 62/625,791, filed on Feb. 2, 2018.

(51) Int. Cl.
| | |
|---|---|
| F22B 1/02 | (2006.01) |
| F22B 1/06 | (2006.01) |
| F22B 1/16 | (2006.01) |
| F22B 37/00 | (2006.01) |
| F28D 7/16 | (2006.01) |
| F28F 9/22 | (2006.01) |

(52) U.S. Cl.
CPC ............... F22B 1/028 (2013.01); F28D 7/16 (2013.01); F28F 9/22 (2013.01)

(58) Field of Classification Search
CPC ..... F22B 1/028; F28D 7/16; F28F 9/22; F28F 2009/224
See application file for complete search history.

(56) References Cited

U.S. PATENT DOCUMENTS

| | | | | |
|---|---|---|---|---|
| 3,006,612 A | * | 10/1961 | Herbert | F28D 7/04 188/196 B |
| 3,333,630 A | | 8/1967 | Charcharos | |
| 3,400,758 A | | 9/1968 | Lee | |
| 3,741,167 A | * | 6/1973 | Polcer | F22B 1/063 122/483 |
| 3,963,071 A | * | 6/1976 | Levin | F23K 5/20 165/104.19 |
| 5,853,549 A | * | 12/1998 | Sephton | B01D 1/065 203/25 |
| 2010/0282451 A1 | | 11/2010 | Singh et al. | |
| 2012/0199331 A1 | * | 8/2012 | Maurer | F28D 7/024 165/172 |

OTHER PUBLICATIONS

Copenheaver, B.; International Search Report from corresponding PCT Application No. PCT/IB2018/053203; search completed Jul. 11, 2018.

* cited by examiner

*Primary Examiner* — Steven S Anderson, II

(74) *Attorney, Agent, or Firm* — Blake, Cassels & Graydon LLP; Christopher N. Hunter; Laurie Wright

(57) ABSTRACT

A steam generator includes a shroud and an annular stepwise helical baffle extending along at least part of a length of the shroud. There is a riser located in a central region of the steam generator. The helical baffle is made up of at least one annular sector of flat plates. The edges of the flat plates may be straight or corrugated.

4 Claims, 7 Drawing Sheets

HELICAL BAFFLE FOR ONCE-THROUGH STEAM GENERATOR

CROSS-REFERENCE TO RELATED APPLICATIONS

This application is a continuation of PCT Application No. PCT/IB2018/053203 filed May 8, 2018 which claims the benefit of priority of U.S. Provisional Patent Application No. 62/625,791 filed Feb. 2, 2018, both of which are hereby incorporated by reference in their entireties.

FIELD AND BACKGROUND OF THE INVENTION

The present invention relates generally to Once-Through-Steam-Generator ("OTSG") and, in particular to a new and useful OTSC employing a helical baffle.

OTSGs with straight tubes are used in the nuclear power industry, as well as in many others. OTSGs are used in pressurized water reactor nuclear power plants ("NPP") to transfer the thermal energy from the primary water that cools the reactor to the secondary water that is the working fluid of the Rankin cycle side of the power plant. In the metal cooled fast breeding nuclear reactor, the OTSG is used to transfer the thermal energy from the molten metal to the water. Also, the OTSG is to be used in many of the new designs of small modular reactor ("SMR").

FIG. 1 shows a typical prior art OTSG with straight tubes 100. An OTSG with straight tubes is an axial counter current heat exchanger. The tube bundle 102 is formed from several thousand straight tubes. The straight tubes are extended between the upper tube sheet 104 and the lower tube sheet 106. Typically, the hot fluid flows inside the tubes and the cold (secondary) fluid flows on the outside of the tubes. The tube bundle 102 is enclosed by the shroud 108. The straight tubes are supported with flat broached support plates 110 at different elevations. The secondary fluid is introduced into the OTSG through the downcomer 112 and enters the tube bundle 102 region from the bottom below the shroud 108. The secondary fluid entered the bundle as saturated liquid or as subcooled liquid depending on the type of the OTSG. If the secondary fluid is subcooled, the bottom region the tube bundle act as preheater. After the secondary fluid reaches the saturation conditions the heat transfer mode changes to boiling that is characterized by high heat transfer rate. The top region of the tube bundle where the secondary fluid is mostly steam is dubbed the superheater region. Both the superheater and preheater region can suffer of low heat transfer coefficient. The superheated steam exits the bundle region from the top to the steam annulus 114.

A typical SMR design 200 is shown in FIG. 2. It is very similar to a typical OTSG except the primary water is introduced through a riser 202 that occupies the center of the OTSG. As a result, the tube bundle 204 forms an annular region between the riser 202 and the shroud 206. The tube support plates 208 for this design are flat annular broached plates.

The main disadvantage of the typical OTSG design is the low heat transfer rate in preheater and the superheater regions of the tube bundle. This disadvantage results in the requirement for a long length of tube to satisfy the targeted thermal hydraulic performance. The reason for this disadvantage is that the heat transfer mode in these two regions is predominately forced convection due axial flow which has relatively low heat transfer coefficient for the typical flow velocities on the secondary side of the OTSG.

The strict requirements for tube inspection in the nuclear industry and other requirements regarding the acceptable level of vibrations and degradation of the tubes limit the ability to use fins or segmental baffles to enhance the heat transfer rate.

Thus, there is a need for a helical baffle that provides the optimal solution of increasing the heat transfer rate in either or both the preheater and the superheater regions. However, the ideal helical baffle is not easy to manufacture or assemble in typical large OTSG.

SUMMARY OF THE INVENTION

This invention solves the above prior art problems by providing a steam generator which includes a shroud and an annular stepwise helical baffle extending along at least part of a length of the shroud.

The invention also includes a riser located in a central region of the steam generator.

In a preferred arrangement, the helical baffle is made of at least one annular sector of flat plates.

The edges of the flat plates may be straight or corrugated.

The present annular stepwise helical baffle is designed to suit a typical OTSG used in the nuclear industry.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

It will be understood that the present invention includes any combination of these the various features of novelty which characterize the invention and any combination of equivalent features. The embodiments which follow are presented for the purposes of illustration only and are not meant to limit the scope of the present invention. Thus, all the features of the embodiments which follow are interchangeable so that each of element each embodiment may be applied to all of the embodiments taught herein.

BRIEF DESCRIPTION OF THE DRAWINGS

In the accompanying drawings, forming a part of this specification, and in which like reference numbers are used to refer to the same or functionally similar elements.

DESCRIPTION OF THE PREFERRED EMBODIMENTS

Figure 1:
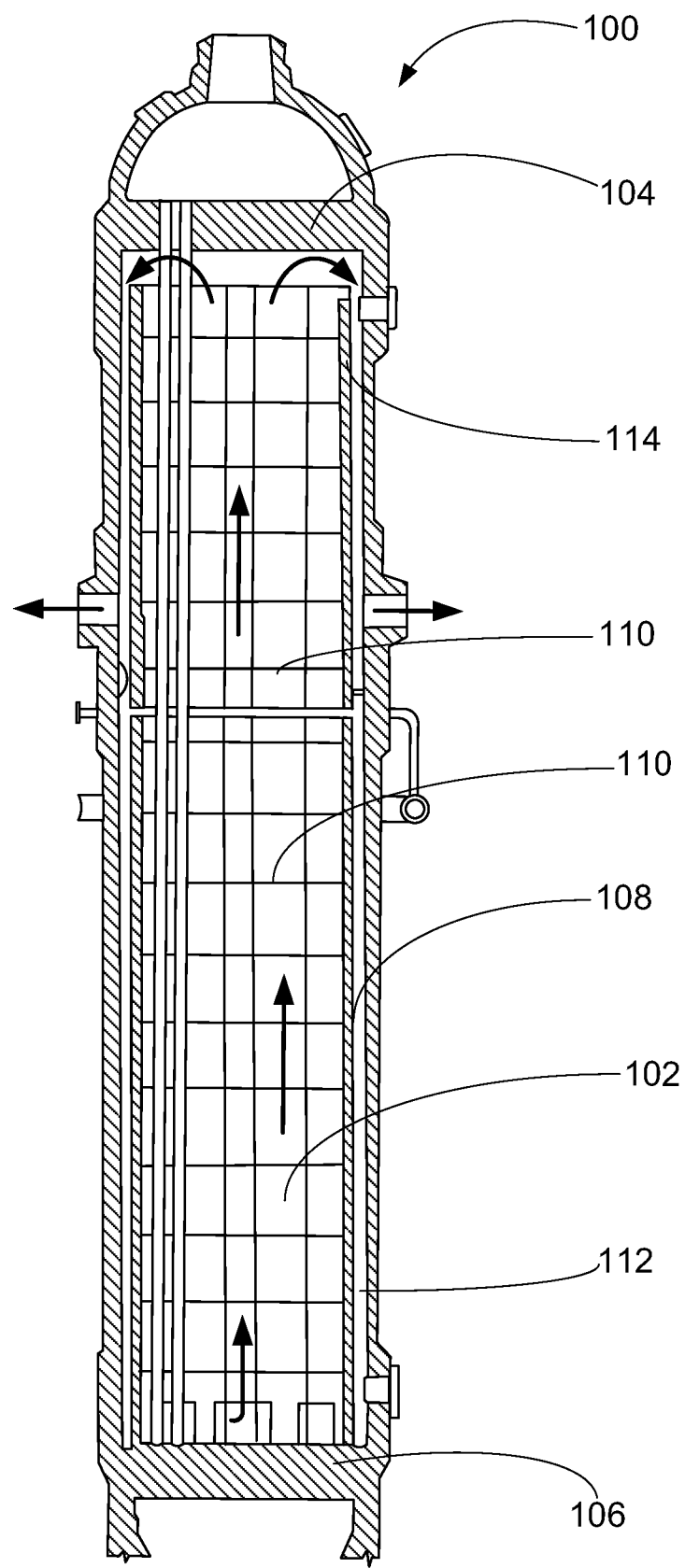
FIG. 1 is a front view of a prior art OTSG arrangement.
Figure 2:
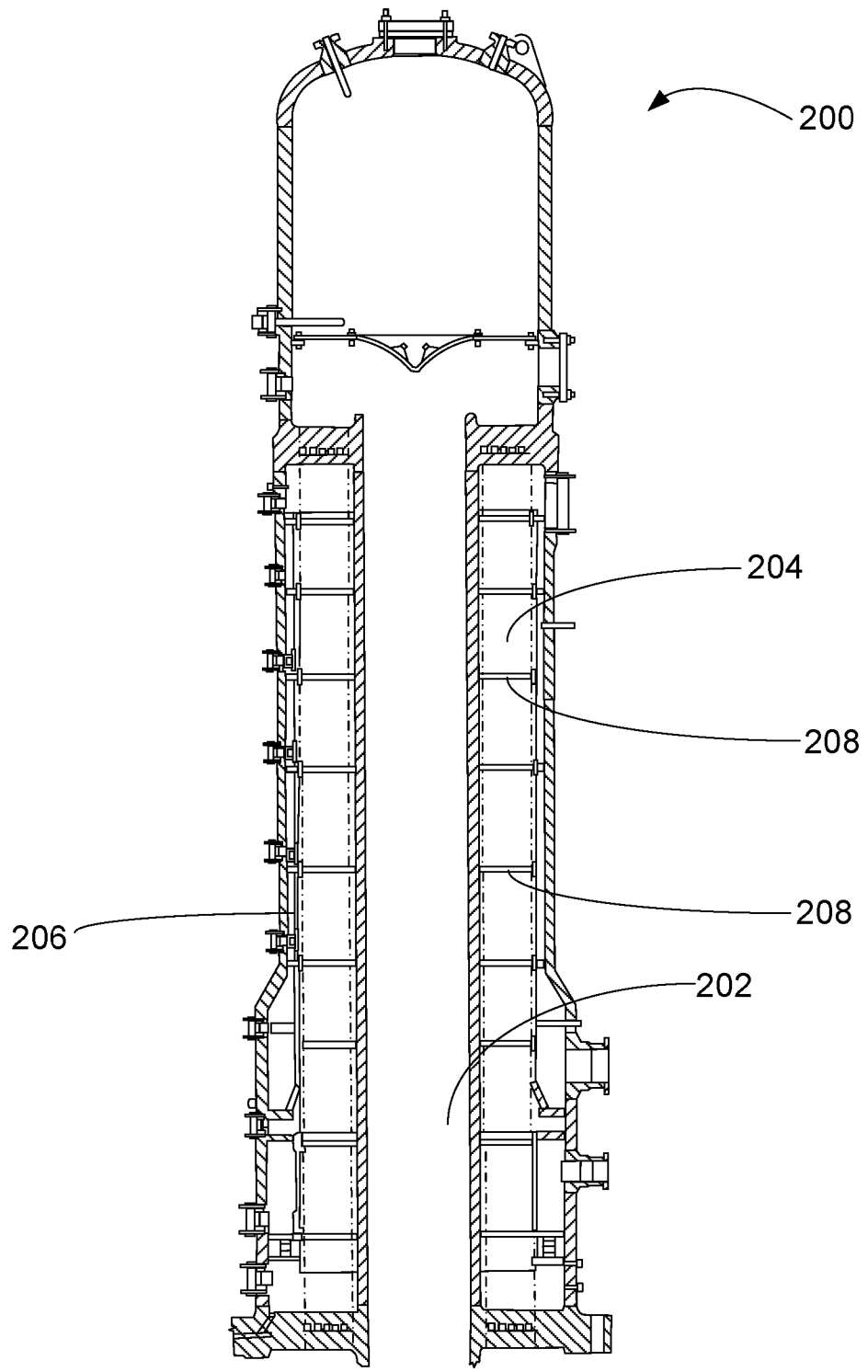
FIG. 2 is a front view of a prior art SMR arrangement.
Figure 3:
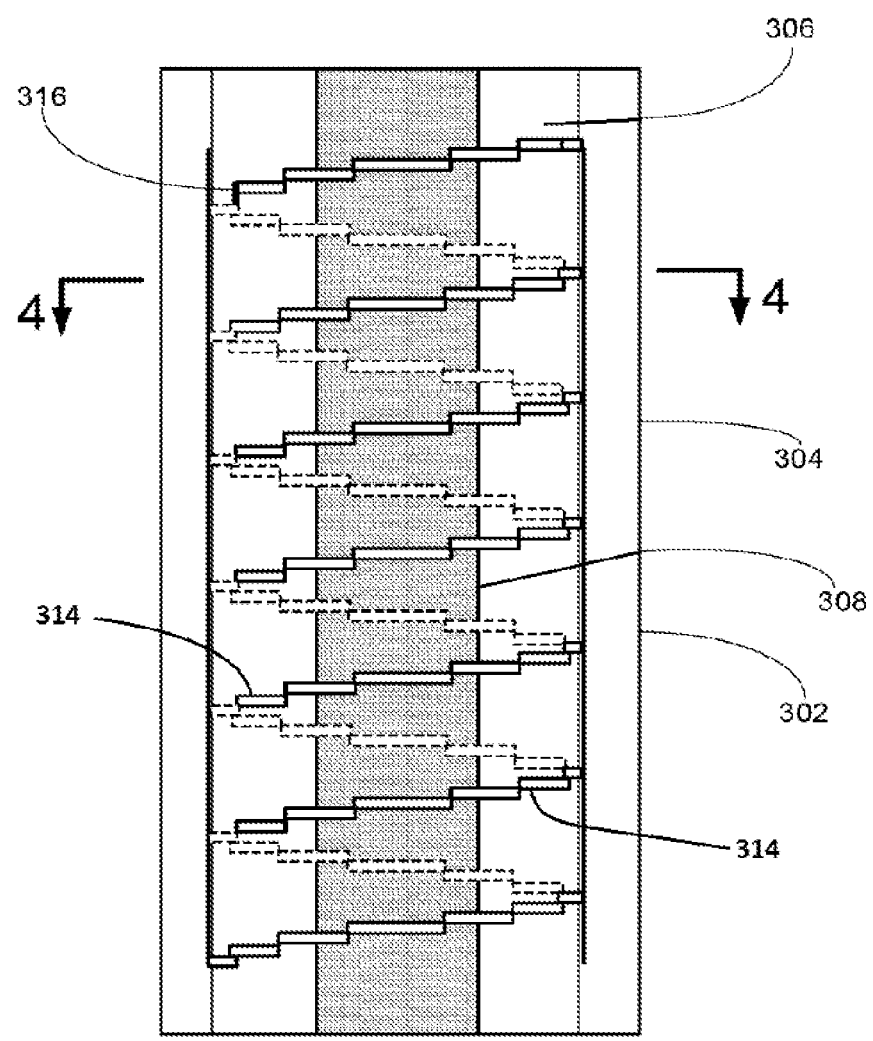
FIG. 3 is a front view of the OTSG according to the present invention.

Referring now to drawing FIGS. 3-7, which depict an OTSG 300 embodying the annular stepwise helical baffle 302 according to the present invention, a preferred embodiment of the present stepwise helical baffle 302 is shown. In certain embodiments, the helical baffle 302 extends from bottom to the top of the shroud 304. In other embodiments, it can be limited to a specific region of the tube bundle 306. Embodiments of the invention may have single or multiple helices. In some embodiments, the central region 308 is occupied by the central riser 310 in the SMR design. In others, it is enclosed by inner shelter 312 for normal full circular bundle.

Figure 4:
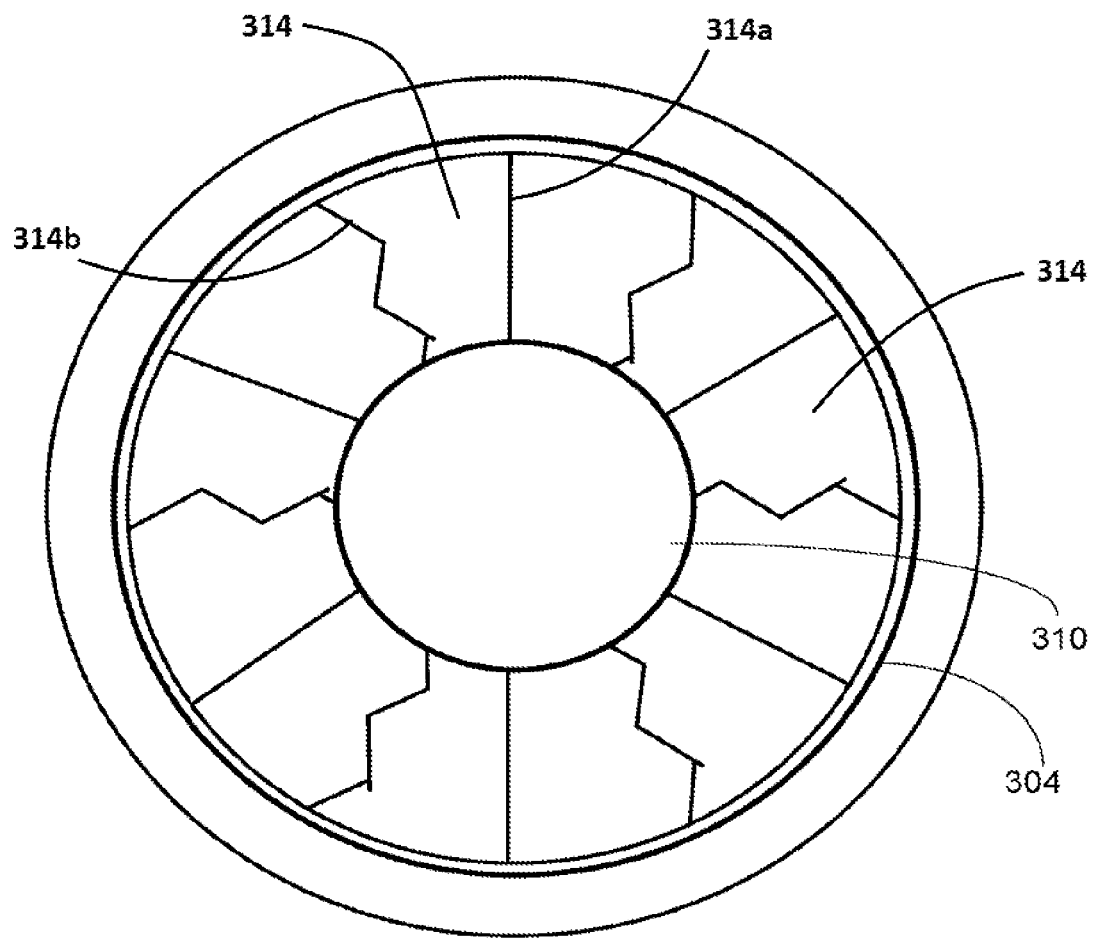
FIG. 4 is a cross sectional view of the OTSG, taken along line 4-4 of FIG. 3.
Figure 5:
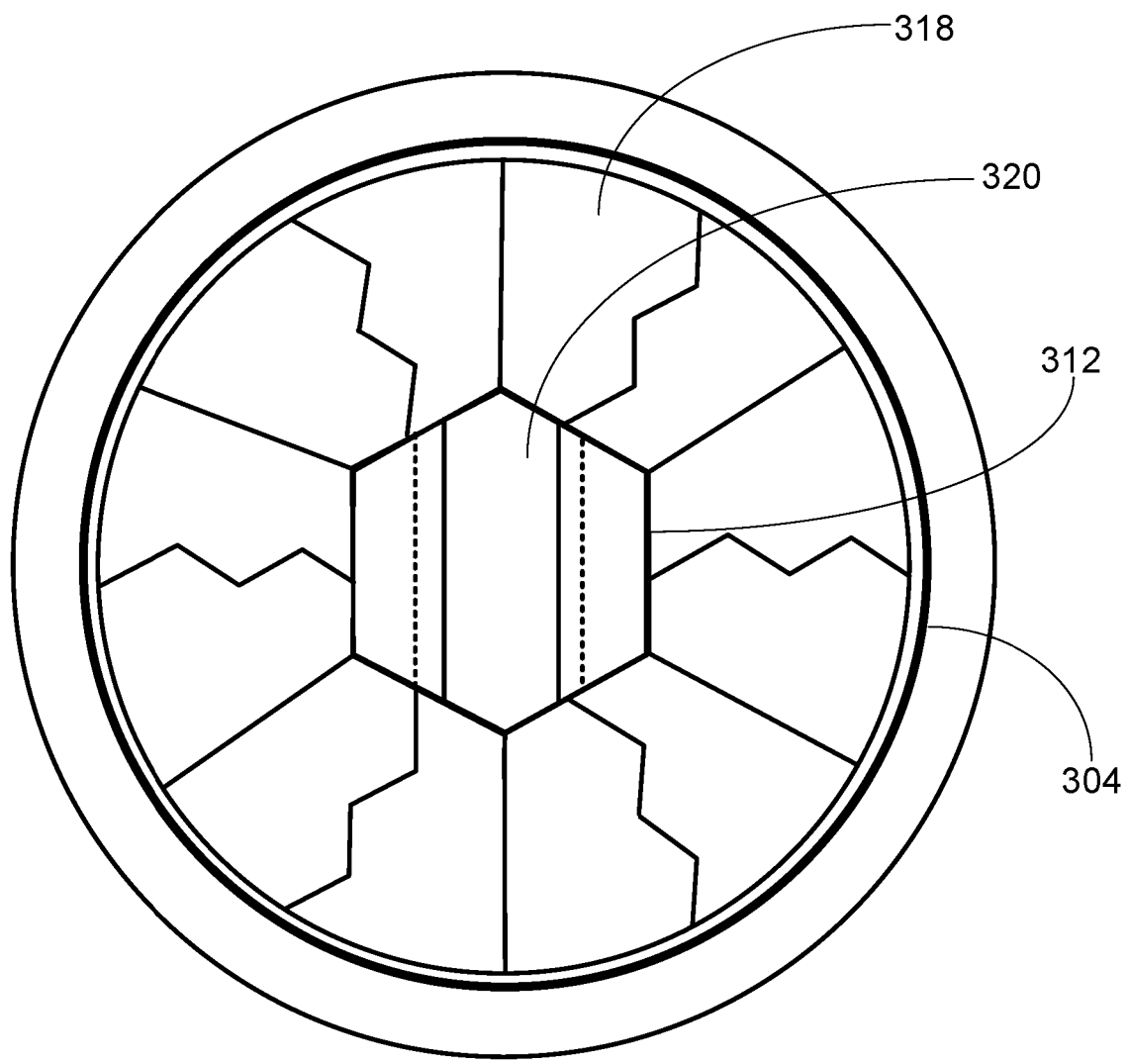
FIG. 5 is a cross sectional view of the OTSG, showing an embodiment of the invention in which an inner shelter is employed.
Figure 6:
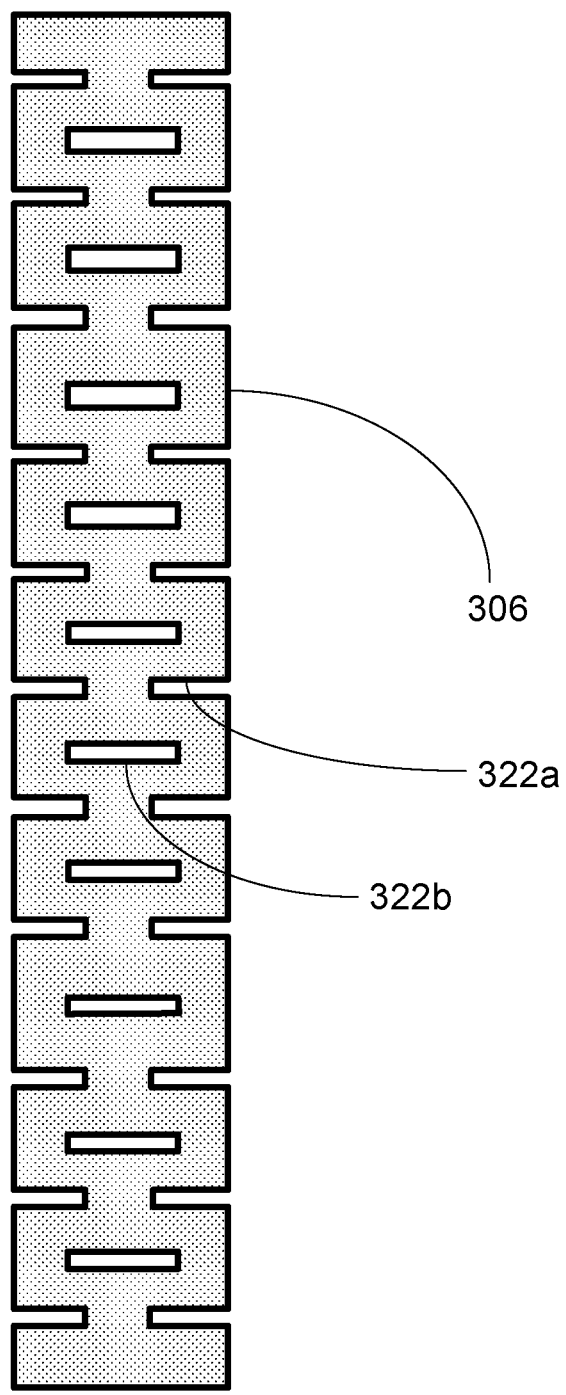
FIG. 6 is a front view of the OTSG showing the use of single segmental baffles and double segmental baffles.
Figure 7:
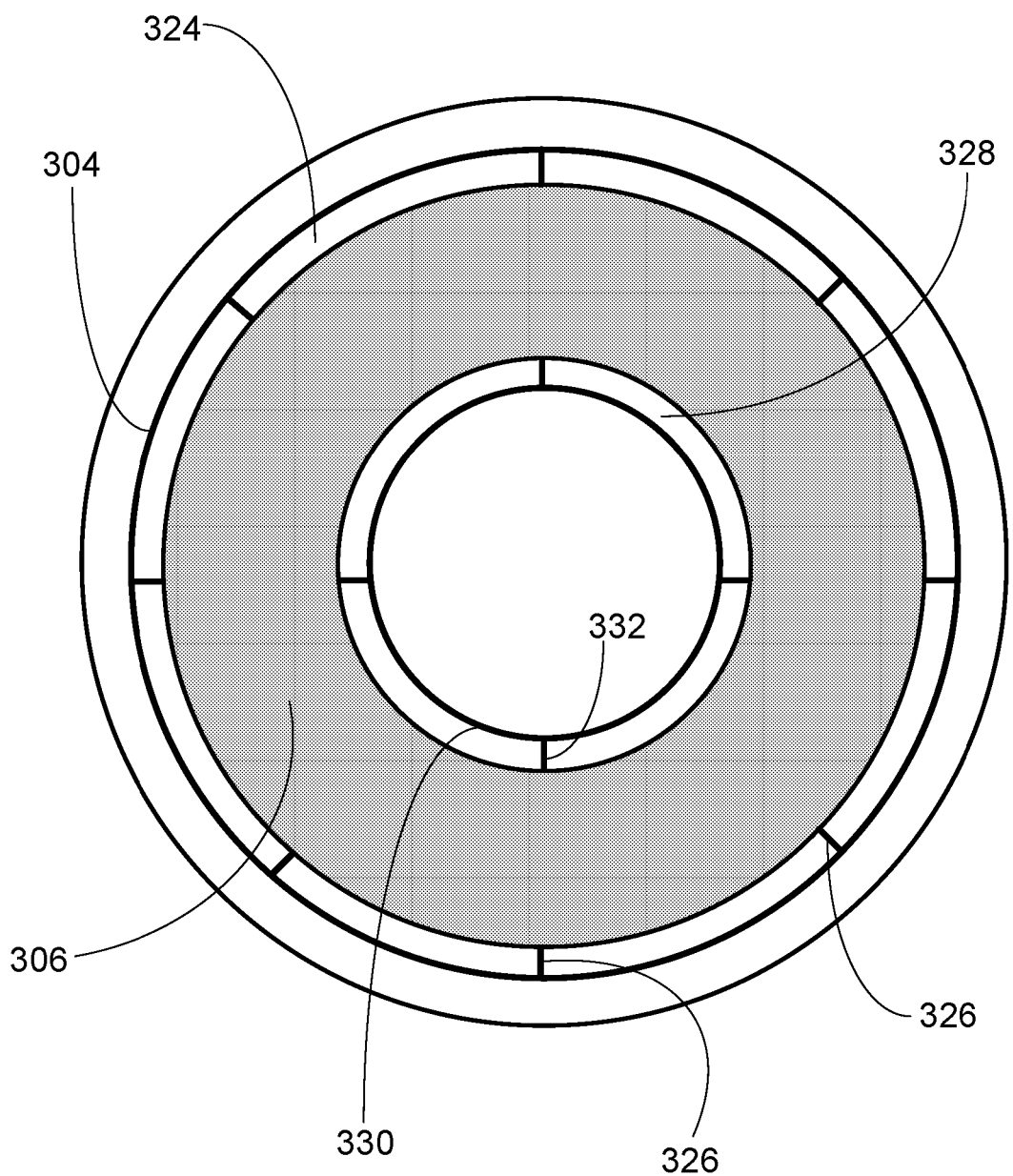
FIG. 7 is a cross sectional view of the OTSG, showing the use of vertical baffles.

The helical baffle 302 is made of an annular sector of drilled only flat plates 314. The segment extends from the central region 310 to the shroud 304. The side edges of the annular sector plates 314 can be straight 314a or corrugated 314b. An important feature is that edges of the sector plate 314 follow the tube drill pattern such that no tube lays along the edges of the annular sector plates 314. FIGS. 4 & 5 show twelve annular sector plates 314 that form a complete 360° annulus. However, the number of sector plates 314 that form the 360° annulus can change depending on the configuration. Those sector plates 314 are positioned side by side and offset axially along the tube bundle 306 direction to form the helical baffle 302. The offset between consecutive sector plates 314 depends on the design. The gap between consecutive sector plates 314 can be sealed depending on the allowable leakage. If an offset bigger than the thickness of the annular sector plate 314 is designed, a vertical plate 316 should be used to connect the edges of the consecutive sector plates. Groups of sector plates 314 can be mechanically fastened or welded together as single part to facilitate assembly.

With reference to FIG. 5, it is also within the scope of the invention for a central shelter 312 to be formed from straight panels that are inserted along the tube bundle 306. The shelter 312 divides the bundle 306 into outer annular region 318 and central region 320. It is within the scope of the invention for the space between tubes (not shown) on both sides of the shelter 312 to be increased to accommodate situations in which thick panels are specified or required for a particular application or situation. The central region 320 of the bundle 306 can be equipped with single segmental baffles 322a or double segmental baffles 322b depending on the requirements of a particular application or situation. The baffles 322a, 322b should be designed to ensure that the pressure drop on both sides of the shelter 312 is the same for an evenly split flow rate.

The gap 324 between the tube bundle region 306 and the shroud 304 is, in certain embodiments, sealed using vertical baffles 326 located at different orientations along the circumference. The vertical baffles 326 are preferably fixed to the shroud 304 or the vertically aligned annular sector plates. Also, the gap 328 between the tube bundle region 306 and the central region outer boundary 330, is in certain embodiments, sealed with vertical baffles 332 that are similar to vertical baffles 326. However, the vertical baffles 332 may extend for a short distance as perforated plates inside the bundle 306 region to introduce additional hydraulic resistance to the flow near the inner radius of the bundle 306. This additional resistance, if required, ensures that the velocity radial distribution does not increase significantly near the inner radius of the bundle 306.

The present invention can be applied to any OTSG. Multiple parameters of the presently disclosed invention can be changed to satisfy different steam generator sizes and bundle arrangements. Such parameters are the number of annular sector plates 314 per 360°, the axial offset between consecutive plates 314, number of helices, the region along the bundle 306 where this design is used, and the size of the central region and the use of baffles 326, 332 in the central region.

The present invention provides many advantages. The present design introduces helical support plates 314 to the tube regions of the OTSG. This new arrangement can be manufactured following the procedure of the current state of the art of the industry. Introducing helical support plates 314 streams the flow to follow support plate 314 orientation which generates cross flow component of the velocity. The presently-disclosed design provides enhancement of heat transfer rate under a wide variety of operating conditions. The cross flow enhances the heat transfer coefficient on the tubes outside surface and consequently the heat transfer rate. Improving the bundle heat transfer rate allows an increase of the thermal duty of the OTSG for the same tube bundle 306 size or reduces the tube bundle 306 size for the same heat duty. This results in a reduction in the NPP capital cost per megawatt.

While a specific embodiment of the invention has been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention. Thus, all the features of all the embodiments disclosed herein are interchangeable so that any element of any embodiment may be applied to any of the embodiments taught herein.

The invention claimed is:

1. A steam generator comprising:
 a shroud having a top and a bottom;
 an annular stepwise helical baffle extending along at least part of a length of said shroud;
 a shelter located in a central region of said steam generator;
 a tube bundle region within said steam generator, said tube bundle region comprising a plurality of tubes;
 wherein said helical baffle comprises an annular sector comprising flat plates, each of said flat plates having at least one side edge; and
 wherein said shelter comprises a plurality of straight panels inserted along said tube bundle, said panels positioned such that said tube bundle is divided into an outer tube bundle region and a central tube bundle region.

2. The steam generator of claim 1, wherein said central tube bundle region further comprises at least one single-segmental baffle.

3. The steam generator of claim 1, wherein said central tube bundle region is equipped with double segmental baffles.

4. The steam generator of claim 1, wherein the shelter is configured such that there is substantially equivalent flow of secondary fluid through both said outer tube bundle region and said central tube bundle region.

* * * * *